A. McKINNON.
CHAIN PIPE WRENCH.
APPLICATION FILED NOV. 11, 1912.
1,062,349.
Patented May 20, 1913.
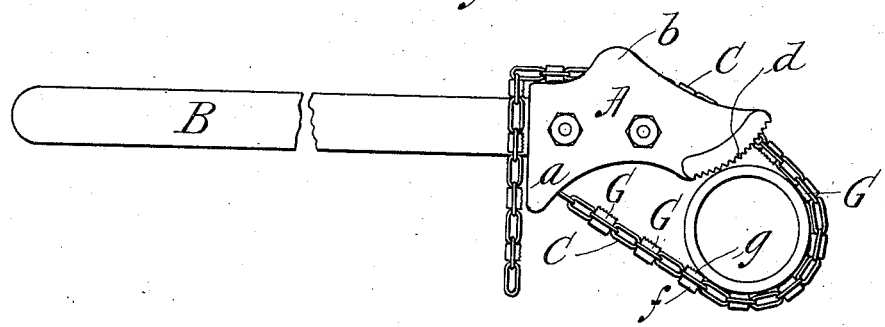
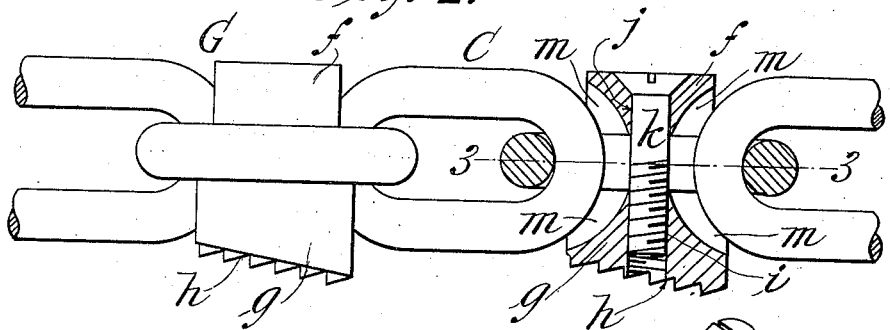
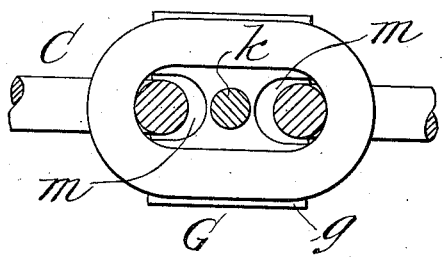
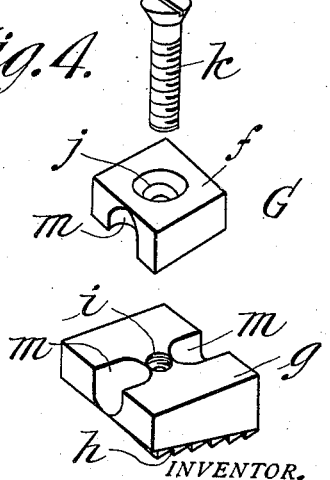
WITNESSES:
R. M. Mowry
W. P. Noble
INVENTOR,
Allan McKinnon,
BY
ATTORNEY.

UNITED STATES PATENT OFFICE.

ALLAN McKINNON, OF HOLYOKE, MASSACHUSETTS.

CHAIN PIPE-WRENCH.

1,062,349.

Specification of Letters Patent.

Patented May 20, 1913.

Application filed November 11, 1912. Serial No. 730,675.

*To all whom it may concern:*

Be it known that I, ALLAN McKINNON, a citizen of the United States of America, and resident of Holyoke, in the county of Hampden and State of Massachusetts, have invented certain new and useful Improvements in Chain Pipe-Wrenches, of which the following is a full, clear, and exact description.

This invention relates to improvements in chain pipe wrenches and has for its object to provide members on a plurality of the links of the chain, which members have serrated faces for more effective gripping action on a pipe than could be acquired merely by the sides or edges of the links of the chain.

While I am aware that it has been heretofore proposed to provide members attachable on the links of the chain of a pipe wrench, these, so far as known to me, have been adapted to, and employed on, chains of the "bicycle chain" type, whereas under my invention the gripping members comprise novel constructions especially adapting and making them available for use on a " cable chain " as termed in the pipe wrench trade.

Another object of the invention is to so construct the pipe gripping members, provided upon a plurality of the links of the chain, that while entirely effective for their primary object, they in no way cause a cramping or binding of the chain, or impair its flexibility for its conformation to and around the pipe to be gripped.

The invention is described in the accompanying drawings and is set forth in the claims.

In the drawings:—Figure 1 is a side elevation of a cable chain pipe wrench, the chain of which has the gripping devices comprised in this invention. Fig. 2 is a side elevation and sectional view of a part of the chain with the gripping devices provided thereto. Fig. 3 is a partial horizontal sectional view as taken on line 3—3, Fig. 2. Fig. 4 is a perspective view of the constituent parts of one of the gripping appliances.

In the drawings, A represents the wrench head carried by the handle bar B,—C representing the " cable chain ", the same, as common in this kind of wrench, having an attachment under the side and at the rear portion $a$ of the head and adapted for engagement at the upper portion $b$,—such member, moreover, having the forwardly located and rearwardly and downwardly inclined serrated portion $d$.

G G represent gripping devices applied at suitable intervals on a plurality of the chain links which are arranged in planes parallel with the periphery of the pipe to be gripped. Each gripping device consists of a pair of blocks $f$ and $g$ arranged in facewise contact against the opposite sides of a given link and between the two links connected with such links, the one $g$ of said blocks having a serrated outer face $h$ located outwardly beyond the edges of the adjacent connected links and inclined from its forward to its rear. The said block $g$ has a screw threaded hole $i$ centrally through the thickness thereof, and the other block has a countersunk hole $j$ through the thickness thereof; and a headed screw $k$ passed through the block $f$ and screw engaging with the block $i$ holds them in their confined and clamped relations on the opposite sides of the link. The said opposing and uniting blocks $f$ and $g$ have recesses $m$ $m$ extending from their end edges to their inner faces, and of curved formation for the reception therein of the end portions of the adjacent links. Such recessed formations permit the freest action of the interconnected links of the chain so that the flexibility of the latter is in no way lessened and so that in the action there can be no cramping or binding of the parts.

I claim:—

1. The combination with a chain pipe wrench having a chain of the cable type, of gripping devices for the links, each comprising a pair of blocks, one of the blocks having a serrated outer face, the opposite face of the block being flat and of sufficient width to engage the opposite parallel sides of an open link and having a central hole and a recess in such face on each side of the hole to receive the end portions of the adjacent links respectively for free movement of the links therein, the other block of the device having its inner face of sufficient width to engage the parallel sides of the link opposite said sides and having a central hole with a recess on each side of the hole to receive and permit free movement of the end portions of the said adjacent links respectively, and a screw tapped in the said hole in one of the blocks and passing through the hole in the other block to clamp the blocks to the said opposite faces of the link.

2. The combination with a chain pipe wrench having a chain of the cable type, of gripping devices for the links, each comprising a pair of blocks, one of the blocks having a serrated outer face, the opposite face of the block being flat and of sufficient width to engage the opposite parallel sides of an open link and having a central hole and a recess in such face in each side of the hole to receive the end portions of the adjacent links respectively for free movement of the links therein, the other block of the device having its inner face of sufficient width to engage the parallel sides of the link opposite the said sides and having a central hole with a recess on each side of the hole to receive and permit free movement of the end portions of the adjacent links respectively, and a screw tapped in the said hole in one of the blocks and passing through the hole in the other block to clamp the blocks to the said opposite faces of the link, the said serrated face of the block being inclined longitudinally to the opposite link engaging face.

Signed by me at Springfield, Mass., in presence of two subscribing witnesses.

ALLAN McKINNON.

Witnesses:
L. McKinnon,
Robert Thompson.

Copies of this patent may be obtained for five cents each, by addressing the "Commissioner of Patents, Washington, D. C."